Jan. 13, 1953           D. SIGNORINI           2,625,389
RESILIENT SUPPORT
Filed Feb. 19, 1948
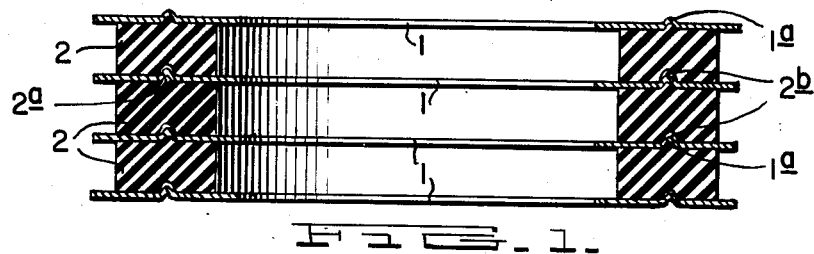
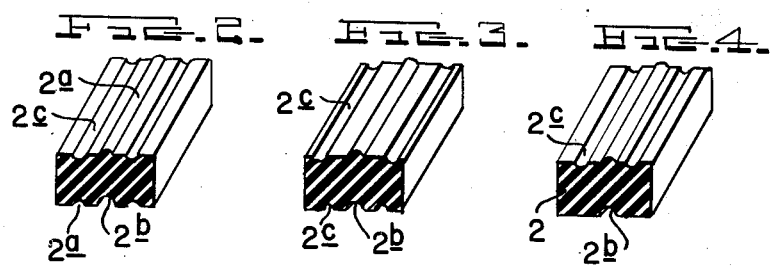
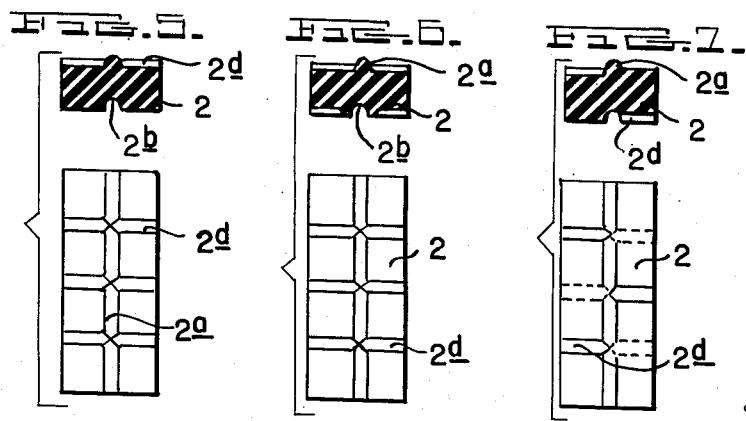
Inventor
Duilio Signorini
By
Stone, Boyden & Mack
Attorneys Patented Jan. 13, 1953

2,625,389

UNITED STATES PATENT OFFICE 2,625,389

RESILIENT SUPPORT

Duilio Signorini, Milan, Italy, assignor to S. A. G. A. Societa Applicazioni Gomma Antivibranti, Milan, Italy, a corporation of Italy Application February 19, 1948, Serial No. 9,607
In Italy July 17, 1946

Section 1, Public Law 690, August 8, 1946
Patent expires July 17, 1966

4 Claims. (Cl. 267—63)

This invention pertains to springs and resilient supports for vehicles, machinery and the like, and more particularly has reference to composite springs and supports which comprise a series of alternate rubber and metal elements arranged one on top of the other in a vertical pile. Such springs may be shaped in plan in various forms, such as straight rectangular or circular strips, or ovoidally or polygonally curved strips, disposed either in a single pile or in groups of piles.

An object of this invention is to provide means for maintaining the piles of strips in vertical alignment and prevent horizontal displacement or slipping of one strip with reference to its adjacent strips.

Another object is to provide elastic strips of novel cross-sectional shape to increase their elasticity and deformability under load and thereby reduce the natural frequency of vibration of such composite springs, or to more effectively reduce the initial shock of impacting loads.

Still another object is to increase the resilience of the rubber elements by the elastic action of air compressed in cavities in the strips.

With these and other objects in view which may be incident to my improvements, my invention consists in the combination and arrangement of elements hereinafter described and illustrated in the accompanying drawing, in which:

Fig. 1 is a diametral, vertical section of a composite spring or support, according to my invention;

Figs. 2, 3 and 4 show in perspective, with vertical sections, three alternate forms of rubber strips used in my improved springs; and Figs. 5, 6 and 7 show, in vertical sections and top plan views, three additional alternate forms of such rubber strips.

Referring to Fig. 1, the reference numeral 1 denotes a series of annular sheet metal discs, each having a central circular rib 1a formed therein by deforming the metal of the disc. Between each adjacent pair of discs 1 is inserted an annular rubber ring 2, of somewhat narrower width, having on its upper face a central, circular tongue 2a, and on its lower face a central, circular groove 2b, formed by so moulding the rubber ring. All of the metal ribs 1a, rubber tongues 2a and grooves 2b are in vertical alignment, so that each metal rib 1a fits into and registers with a groove 2b in the next higher rubber ring, and each rubber tongue 2a fits into and registers with the groove in the next higher metal disc which results from upsetting the metal of the disc to form its rib 1a.

Each rubber tongue 2a is of such size and shape as to fit snugly into and completely fill the adjacent metal groove and each rubber groove 2b is so shaped that while its base width is exactly equal to the base width of the adjacent metal rib 1a, its depth materially exceeds the height of the adjacent metal rib 1a, so that an annular air pocket is defined between the top of each metal rib 1a and its adjacent rubber groove 2b. By the registration of the rubber tongues in adjacent metal grooves and metal ribs in adjacent rubber grooves, the whole pile of metal discs 1 and rubber rings 2 are held in vertical alignment and lateral slipping or displacement of any metal disc or rubber ring is prevented.

The excess depth of each rubber groove 2b over its registered metal rib 1a, increases the overall resiliency of the composite spring in two ways. First, it permits each rubber ring to resist the imposed load by arch action across the groove 2b in the mid-portion of the ring, which is a more elastic action than the simple compressive deformation of the outer portions of the ring; and secondly, the air entrapped in the pocket between each registered groove 2b and rib 1a exerts an elastic resistance to compression under load, similar to an air-inflated pneumatic tire.

The alternate cross-sections of the rubber strips shown in Figs. 2-7 inclusive, illustrate the wide variety of forms in which these elements may be used in practising my invention and further emphasize the characteristics of these strips as elements of differently shaped springs in which they may be used.

In the form shown in Fig. 2, in addition to the central top tongue 2a and bottom groove 2b, as in Fig. 1, the strip has two extra parallel grooves 2c in its top and bottom faces. In Fig. 3, the strip has the same number and kind of grooves as in Fig. 2, but the top grooves 2c are nearer the edge of the strip, so that they are staggered with reference to the bottom grooves 2c which are in the same location as in Fig. 2. The strip shown in Fig. 4 is the same as in Fig. 2, except that the bottom grooves 2c are omitted.

The strips shown in Figs. 5, 6 and 7, are the same as shown in Fig. 1, except that they are provided with transverse grooves 2d which run at right angles with central top tongues 2a and bottom grooves 2b. In Fig. 5, the transverse grooves 2d appear in the top face of the strip; in Fig. 6, grooves 2d are in both top and bottom faces of the strip; while in Fig. 7, the grooves 2d are provided alternately in the top and bottom faces of the strip so as to be staggered in relation to each other. When the transverse grooves 2d are in the same face as the central groove 2b, as in Figs. 6 and 7, they may or may not communicate with the central groove 2b. If grooves 2d do communicate with groove 2b, the outer ends of the former are closed by the side walls of the rubber strip, and if the strip is of a plan shape which does close up on itself, central grooves 2b are also similarly closed in all forms of the strip, so as to form an air-tight pocket.

While I have shown and described the preferred embodiments of my invention, it is to be understood that I do not limit myself to the precise details of construction disclosed by way of illustration, as these may be changed or modified by those skilled in the art without departing from the spirit of my invention or exceeding the scope of the appended claims.

I claim:

1. A resilient support or spring comprising a series of annular rubber strips and annular, rigid spacer strips arranged alternately in a vertical pile; each rigid spacer strip having a central annular rib on its top face and a central annular groove on its bottom face; each of said rubber strips having a preformed central, annular rubber tongue on its top face and a preformed central annular groove in its bottom face, said second mentioned groove being materially deeper than the heights of the adjacent rigid ribs, whereby an air pocket is defined between each second mentioned groove and adjacent rigid rib; and all of said rubber and rigid strips being held in vertical alignment with each other by the registering of said rubber tongues in adjacent first mentioned grooves, and said rigid ribs in adjacent second mentioned grooves.

2. A resilient support or spring according to claim 1, in which said grooves in said rubber strips are of the same base widths but of greater depths than the heights of the adjacent rigid ribs, whereby the lower side walls of said grooves contact and are supported by said ribs when the rubber strips are compressed under load.

3. A resilient support or spring according to claim 1, wherein each of said grooves in said rubber strips, with its adjacent rigid rib, defines an air pocket which resists the compression of said rubber strip by the elastic force of the air compressed in said pocket.

4. A resilient support or spring according to claim 1, wherein the groove in each rubber strip is deeper than the height of the adjacent rigid rib so each rubber strip resists its imposed load by arch action across its groove.

DUILIO SIGNORINI.

REFERENCES CITED

The following references are of record in the file of this patent:

UNITED STATES PATENTS

| Number | Name | Date |
| --- | --- | --- |
| 1,753,985 | Flintermann | Apr. 8, 1930 |
| 1,924,237 | Glascodine | Aug. 29, 1933 |

FOREIGN PATENTS

| Number | Country | Date |
| --- | --- | --- |
| 220,617 | Switzerland | July 16, 1942 |
| 375,954 | Great Britain | July 7, 1932 |
| 430,193 | Great Britain | June 14, 1935 |
| 440,925 | Great Britain | Jan. 8, 1936 |
| 641,316 | Great Britain | Aug. 9, 1950 |

OTHER REFERENCES

Automotive and Aviation Industries, Aug. 15, 1943, page 29.